US012603079B2

(12) United States Patent
Su et al.

(10) Patent No.: US 12,603,079 B2
(45) Date of Patent: Apr. 14, 2026

(54) PROVIDING A REPOSITORY OF AUDIO FILES HAVING PRONUNCIATIONS FOR TEXT STRINGS TO PROVIDE TO A SPEECH SYNTHESIZER

(71) Applicant: INTERNATIONAL BUSINESS MACHINES CORPORATION, Armonk, NY (US)

(72) Inventors: Jun Su, Beijing (CN); Yang Liang, Beijing (CN); Terry James Hoffman, Austin, TX (US); Su Liu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 444 days.

(21) Appl. No.: 18/151,953

(22) Filed: Jan. 9, 2023

(65) Prior Publication Data

US 2024/0233703 A1 Jul. 11, 2024

(51) Int. Cl.

*G10L 15/22* (2006.01)
*G10L 13/027* (2013.01)
*G10L 13/08* (2013.01)

(52) U.S. Cl.

CPC ............ *G10L 13/027* (2013.01); *G10L 13/08* (2013.01)

(58) Field of Classification Search

None

See application file for complete search history.

(56) References Cited

U.S. PATENT DOCUMENTS 5,634,084 A 5/1997 Malsheen et al.
6,505,158 B1 * 1/2003 Conkie .................. G10L 13/07 704/260

(Continued)

FOREIGN PATENT DOCUMENTS

| | | | |
|---|---|---|---|
| CN | 113112996 | A | 7/2021 |
| WO | 2005116991 | A1 | 12/2005 |
| WO | 2006015115 | A2 | 2/2006 |

OTHER PUBLICATIONS

"1,697 Common Text Abbreviations & Acronyms", Webopedia, Jan. 10, 2022-, 65pp., [online][retrieved Nov. 30, 2022-] https://www.webopedia.com/reference/text-abbreviations.

(Continued)

*Primary Examiner* — Jakieda R Jackson
(74) *Attorney, Agent, or Firm* — Konrad, Raynes, Davda & Victor LLP; David Victor

(57) ABSTRACT

Provided are a computer program product, system, and method for providing a repository of audio files having pronunciations for text strings to provide to a speech synthesizer. The repository has data structures for text strings in documents. A data structure for a text string indicates at least one attribute of a presentation of the text string in the document and at least one audio file providing at least one audio pronunciation of the text string. A search text string and a search attribute are received from the speech synthesizer. A determination is made of a data structure in the repository including a text string and an attribute matching the search text string and the search attribute, respectively. An audio file, indicated in the determined data structure, is returned to the speech synthesizer to output for the search text string in a document being processed by the speech synthesizer.

20 Claims, 6 Drawing Sheets

(56) References Cited

U.S. PATENT DOCUMENTS

| | | | | |
|---|---|---|---|---|
| 6,684,187 | B1 * | 1/2004 | Conkie | G10L 13/07 704/266 |
| 6,975,985 | B2 | 12/2005 | Kriechbaum et al. | |
| 7,590,533 | B2 | 9/2009 | Hwang | |
| 8,688,435 | B2 | 4/2014 | Nasri et al. | |
| 8,712,776 | B2 * | 4/2014 | Bellegarda | G10L 13/08 704/260 |
| 10,140,973 | B1 | 11/2018 | Dalmia et al. | |
| 11,410,656 | B2 * | 8/2022 | Aher | G10L 13/00 |
| 12,230,243 | B2 * | 2/2025 | Mirzoyan | G10L 13/08 |
| 2003/0225571 | A1 * | 12/2003 | Levin | G10L 13/00 704/E15.02 |
| 2004/0034523 | A1 * | 2/2004 | Han | G09B 19/06 704/8 |
| 2005/0267757 | A1 | 12/2005 | Iso-Sipila et al. | |
| 2006/0224385 | A1 * | 10/2006 | Seppala | G10L 13/08 704/E13.011 |
| 2007/0280438 | A1 * | 12/2007 | Pritchett | H04L 12/66 379/88.13 |
| 2008/0065383 | A1 * | 3/2008 | Schroeter | G10L 13/06 704/260 |
| 2008/0208574 | A1 * | 8/2008 | Chen | G10L 13/08 704/221 |
| 2009/0204386 | A1 * | 8/2009 | Seligman | G06F 40/58 704/2 |
| 2010/0057461 | A1 * | 3/2010 | Neubacher | G10L 15/063 704/254 |
| 2010/0169075 | A1 * | 7/2010 | Raffa | G10L 13/00 704/260 |
| 2010/0211376 | A1 | 8/2010 | Chen et al. | |
| 2011/0112832 | A1 * | 5/2011 | Prorock | G11B 27/36 704/E15.044 |
| 2011/0295606 | A1 * | 12/2011 | Ben-Ezri | G10L 15/26 704/260 |
| 2011/0298637 | A1 * | 12/2011 | Posner | H04H 20/55 340/905 |
| 2012/0221339 | A1 * | 8/2012 | Wang | G10L 13/08 704/260 |
| 2013/0179170 | A1 | 7/2013 | Cath et al. | |
| 2015/0364128 | A1 * | 12/2015 | Zhao | G06N 3/02 704/259 |
| 2017/0154033 | A1 * | 6/2017 | Lee | G10L 15/16 |
| 2018/0190269 | A1 * | 7/2018 | Lokeswarappa | G09B 19/06 |
| 2018/0330729 | A1 * | 11/2018 | Golipour | G10L 15/26 |
| 2019/0043500 | A1 * | 2/2019 | Malik | H04N 21/2187 |
| 2019/0164545 | A1 * | 5/2019 | Greenberger | G10L 15/22 |
| 2020/0082805 | A1 * | 3/2020 | Zhang | G10L 13/027 |
| 2020/0175961 | A1 * | 6/2020 | Thomson | G10L 15/28 |
| 2020/0357390 | A1 * | 11/2020 | Bromand | G10L 13/00 |
| 2021/0050006 | A1 * | 2/2021 | Andreas | G06N 20/00 |
| 2021/0266641 | A1 * | 8/2021 | Selfors | H04N 21/44 |
| 2021/0350784 | A1 * | 11/2021 | Selvaggi | G10L 13/047 |
| 2024/0144911 | A1 * | 5/2024 | Abid | G10L 15/187 |

OTHER PUBLICATIONS

M.Chu, et al., “A Study on How Human Annotations Benefit the TTS Voice”, Microsoft Research Asia, 2006, 4pp.
“Do You Spell Out These Abbreviations?”, Dictionary.com, dated Sep. 8, 2020, 5 pp.[online][retrieved Nov. 30, 2022] https://www.dictionary.com/e/abbreviations-spe.
A. Salahshour, et al., “Method for Differential Text-to-Speech Acronym Pronunciation”, IP.com, IP.com No. IPCOM000111248D, Feb. 1, 1994, 3pp.
“Speech Synthesis Markup Language (SSML) Version 1.1”, W3C, 2010, 43pp., [online][retrieved Nov. 30, 2022] https://www.w3.org/TR/speech-synthesis11/.
“Speech Synthesis”, Wikipedia, 17pp., [online][retrieved Nov. 30, 2022] https://en.wikipedia.org/wiki/Speech_synthesis.
“Speech Synthesis Markup Language (SSML)”, Cloud.Google.com, last updated Nov. 30, 20220, 20pp., [online][retrieved Nov. 30, 2022] https://cloud.google.com/text-to-speech/docs/ssml.

* cited by examiner

PROVIDING A REPOSITORY OF AUDIO FILES HAVING PRONUNCIATIONS FOR TEXT STRINGS TO PROVIDE TO A SPEECH SYNTHESIZER

BACKGROUND OF THE INVENTION

1. Field of the Invention

The present invention relates to a computer program product, system, and method for providing a repository of audio files having pronunciations for text strings to provide to a speech synthesizer.

2. Description of the Related Art

A speech synthesizer converts normal language text into speech using a text-to-speech algorithm. The speech synthesizer produces output speech audio by concatenating pieces of recorded speech determined for units of the text in the document. Users may customize the speech produced by the speech synthesizer by annotating a document to subject to speech synthesis with predefined audio to use for certain text strings in the document when the user wants the speech synthesizer to use a specified audio output over the sounds the speech synthesizer would produce by default. Speech Synthesis Markup Language (SSML) is an XML-based markup language for speech synthesis applications. Users may encode a document with SSML statements that provide audio for the speech synthesizer to use for certain defined text strings when converting text to speech in the document.

There is a need in the art to provide improved techniques for providing audio for a speech synthesizer to use when converting text to speech.

SUMMARY

Provided are a computer program product, system, and method for providing a repository of audio files having pronunciations for text strings to provide to a speech synthesizer. The repository has data structures for text strings in documents. A data structure for a text string in a document indicates at least one attribute of a presentation of the text string in the document and at least one audio file providing at least one audio pronunciation of the text string. A search text string and a search attribute are received from the speech synthesizer. A determination is made of a data structure in the repository including a text string and an attribute matching the search text string and the search attribute, respectively. An audio file, indicated in the determined data structure, is returned to the speech synthesizer to output for the search text string in a document being processed by the speech synthesizer.

DETAILED DESCRIPTION

Figure 1:
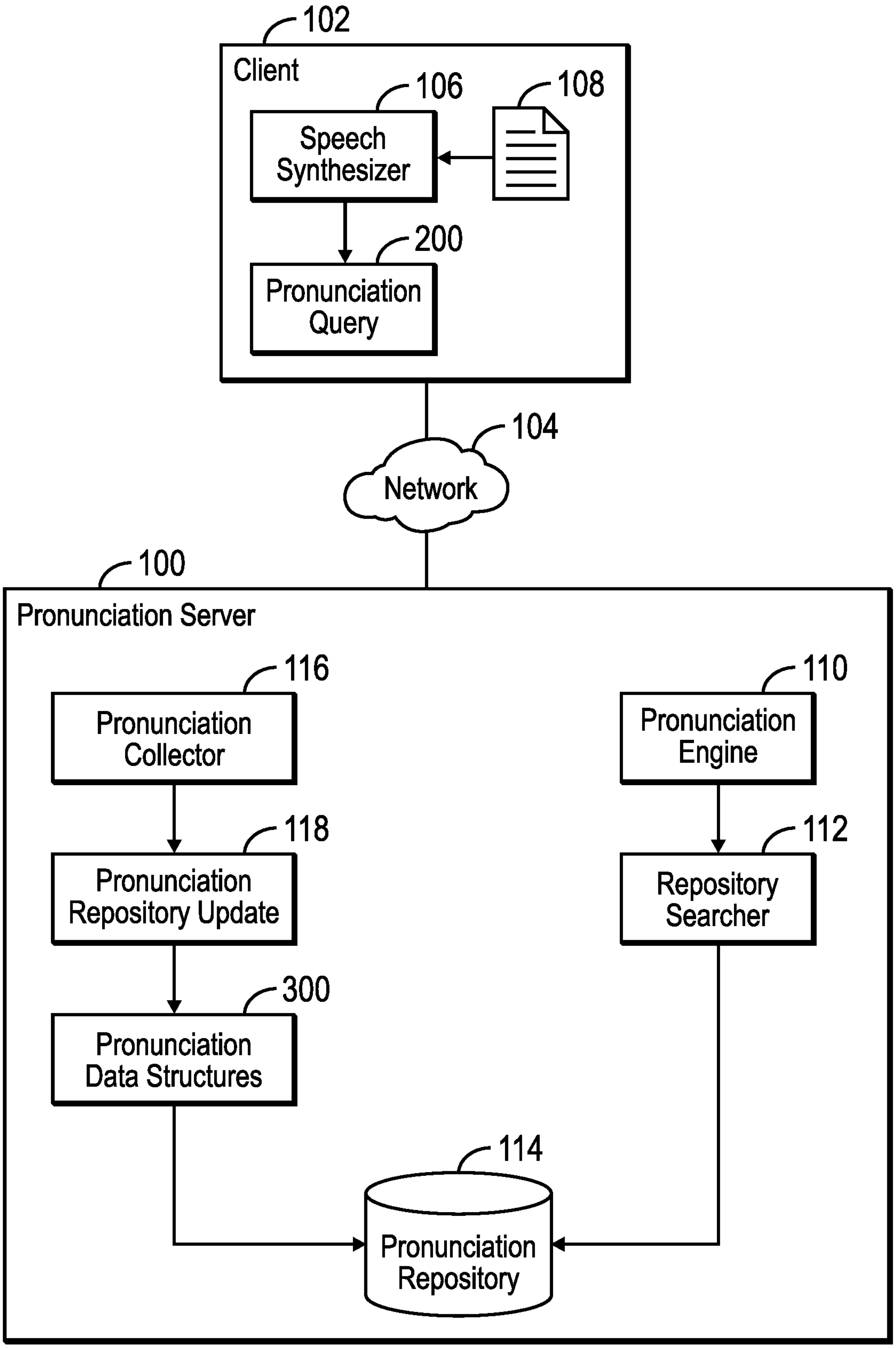
FIG. 1 illustrates an embodiment of a computing environment to provide pronunciations to a speech synthesizer to use when converting text to speech.

Speech synthesizers may produce pronunciations for certain types of text strings, such as abbreviations and acronyms, that are not the common expected pronunciation in the particular category or language of the text being converted to speech. For instance, in the category of information technology, the text string "IEEE" is an abbreviation/acronym for the "Institute of Electrical and Electronics Engineers". A speech synthesizer may produce a pronunciation based on the phonetics that is not the expected pronunciation of that acronym in the category of information technology, such as "I Triple E". Currently, a user may encode the document to speech synthesize with an annotation providing the correctly understood pronunciation of this acronym IEEE. However, relying on user inserted annotations to provide a correct pronunciation for an acronym can be tedious for the user to have to annotate documents. Further, many documents to speech synthesize may not include annotations providing correct pronunciations for abbreviations and acronyms given the context of the document/text.

Described embodiments provide improvements to speech synthesis technology by providing a repository of pronunciation data structures having audio files including pronunciations for a specific type of text strings that speech synthesizers may not convert to speech in an acceptable manner, such as abbreviations and acronyms. These pronunciation data structures having the pronunciation audio files for a text string may further include attributes for the presentation of the text string in the audio file, such as category and language. When the speech synthesizer detects this specific type of text string, such as abbreviations and acronyms, for which the repository provides pronunciations, then the speech synthesizer may send a pronunciation query to a pronunciation server to query the repository to determine a pronunciation data structure having the attributes and text string of the pronunciation query that will provide an audio file having a user acceptable pronunciation of the text string for the category. This allows the speech synthesizer to produce accurate and commonly understood pronunciations of acronyms and abbreviations that the speech synthesizer's default text-to-speech conversion would not pronounce in a commonly understood manner. This allows the speech synthesizer to produce pronunciations that are commonly understood in a particular language and category of use.

The described embodiments provide further improvements to speech synthesis technology by providing technology to collect and harvest pronunciation audio files providing pronunciations for specific types of strings, such as abbreviations and acronyms. Described embodiments provide technology to harvest audio files for specific types of text strings from network sites, such as web sits on the Internet or local network sites and locations, from a closed caption transcription of an audio file that provides pronunciations for the specific type of text string, e.g., abbreviations and pronunciations, and from user supplied annotations in the text to convert to speech.

FIG. 1 illustrates an embodiment of a pronunciation server 100 in communication with a client system 102 over a network 104. The client 102 includes a speech synthesizer 106, such a text-to-speech system, to convert text strings in a document 108, comprising a collection of text, to speech or audio output. The speech synthesizer 106 when processing a specified type of text string, such as an abbreviation or acronym, in a text document 108 may generate a pronunciation query 200, such as in the form of an Application Programming Interface (API), to request an audio file, such as a digital audio file, that provides a pronunciation for the specified text string. The pronunciation server 100 includes components to process the pronunciation query 200, including a pronunciation engine 110 to receive the pronunciation query 200 and invoke a repository searcher 112 to search a pronunciation repository 114 for a pronunciation data structure 300$_i$ (FIG. 3) providing an audio file for the text string and search attributes, such as language and category, included in the pronunciation query 200.

The pronunciation server 100 may further include a pronunciation collector 116 to gather information on digital audio files providing pronunciations for specified text strings, such as acronyms/abbreviations, to include in the pronunciation repository 114. For instance, the pronunciation collector 116 may process certain web sites and network locations providing audio files of pronunciations for abbreviations/acronyms to add to the pronunciation repository 114, such as described with respect to FIG. 5. The pronunciation collector 116 may also process a closed caption transcription of an audio file text synchronized with audio segments in the audio file to determine audio segments for the text strings to add to the pronunciation repository, such as described with respect to FIG. 6. The pronunciation collector 116 may also receive user annotations embedded in the document/text 108 specifying audio files to use for specified text strings, such as abbreviations or annotations. The annotations may comprise Speech Synthesis Markup Language (SSML) statements that allow the user to encode the text 108 subject to text-to-speech conversion with specified audio files to use to pronounce the terms in the document 108 and not rely on the native speech synthesizer 106 pronunciation, as described with respect to FIG. 7.

The pronunciation collector 116 may invoke a pronunciation repository updater 118 to determine whether the repository 114 includes a data structure 300$_i$ for the text string and attributes for the collected audio file or whether a new data structure 300$_i$ needs to be created for the collected audio file. The pronunciation repository updater 118 may update any pre-existing data structure for the text string with information on the collected audio file or create a new data structure 300$_i$ if there is not one for the text string and attributes of the collected audio file.

The network 104 may comprise a network such as a Storage Area Network (SAN), Local Area Network (LAN), Intranet, the Internet, Wide Area Network (WAN), peer-to-peer network, wireless network, arbitrated loop network, etc.

The arrows shown in FIG. 1 between the components and objects in the pronunciation server 100 and the client 102 represent a data flow between the components.

Generally, program modules, such as the program components 106, 110, 112, 116, 118 may comprise routines, programs, objects, components, logic, data structures, and so on that perform particular tasks or implement particular abstract data types. The program components and hardware devices of the computing devices 100 and 102 of FIG. 1 may be implemented in one or more computer systems, where if they are implemented in multiple computer systems, then the computer systems may communicate over a network.

The program components 106, 110, 112, 116, 118 may be accessed by a processor from memory to execute. Alternatively, some or all of the program components 106, 110, 112, 116, 118 may be implemented in separate hardware devices, such as Application Specific Integrated Circuit (ASIC) hardware devices.

The functions described as performed by the program 106, 110, 112, 116, 118 may be implemented as program code in fewer program modules than shown or implemented as program code throughout a greater number of program modules than shown.

The program components described as implemented in the pronunciation server 100 may be implemented in the speech synthesizer 106 or at the client system 102.

The client computer 102 may comprise a personal computing device, such as a laptop, desktop computer, tablet, smartphone, etc. The server 100 may comprise one or more server class computing devices, or other suitable computing devices. The systems 100 and 102 may comprise physical machines or virtual machines.

Figure 2:
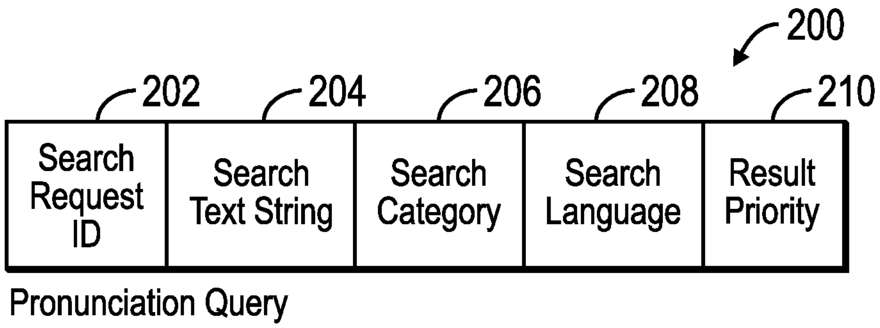
FIG. 2 illustrates an embodiment of a pronunciation query for a speech synthesizer to submit to a pronunciation server to obtain audio for a specified text string type in the document.

FIG. 2 illustrates an embodiment of a pronunciation query 200 presented by the speech synthesizer 106 to request a digital audio pronunciation for a specified text string, such as an abbreviation or acronym, and includes: a search request identifier (ID) 202; a search text string 204 for which the pronunciation is to be provided, such as an abbreviation/acronym; a search category 206 providing a context of the document including the search text string 204, such as information technology, computer science, legal, sports, business, soccer, basketball, film industry, etc.; a search language 208 of the language of the search text string 204; and a result priority 210 indicating whether a highest priority audio file should be returned or if there are multiple audio files to return multiple of the highest priority audio files. A highest priority audio file may comprise an audio file having a most frequently noted audio file/pronunciation of a text string.

Figure 3:
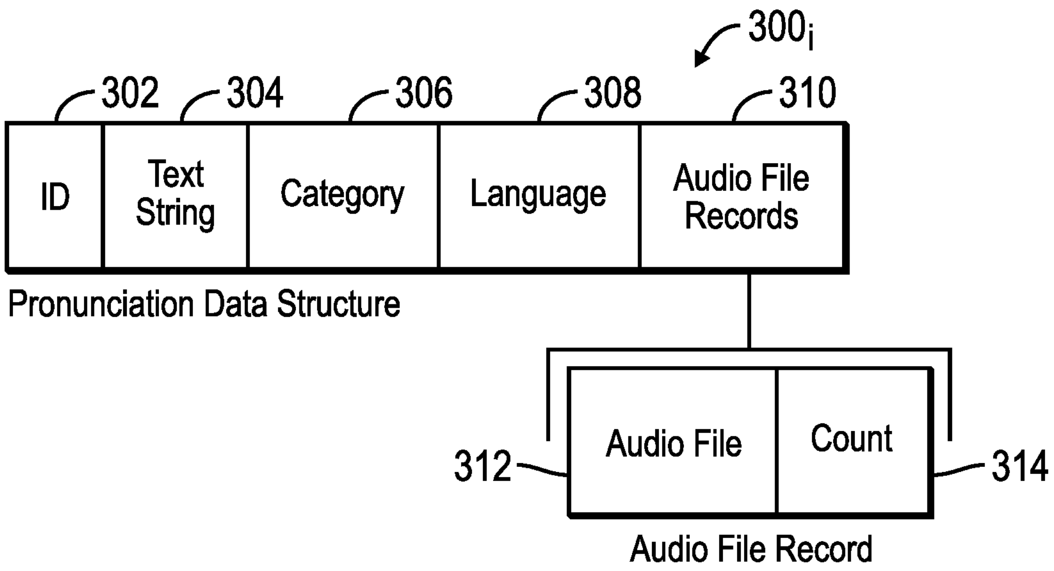
FIG. 3 illustrates an embodiment of a pronunciation data structure providing audio files to use for certain specified text strings.

FIG. 3 illustrates an embodiment of an instance of a pronunciation data structure 300$_i$ indicating an audio file providing a pronunciation of a text string used in the presence of certain attributes, such as category and language. The pronunciation data structure 300$_i$ includes an identifier 302; a text string 304, such as an abbreviation/acronym; a category 306 providing a context in which the text string 304 was used, such as a field of use, e.g., information technology, legal, sports, business, etc.; a language 308 of the text string 304; and one or more audio file records 310 providing pronunciations for the text string 304 for the category 306 and language 308. An audio file record 310 may indicate a digital audio file 312 providing the pronunciation and a count 314 indicating a number of times the pronunciation in the audio file 312 was located by the pronunciation collector 116 for the text string 304 in the context of the category 306 and language 308. The indication of the audio file 312 may comprise a link or address to the digital audio file in a network accessible storage location or comprise the digital audio file itself.

In FIG. 3, the attributes associated with the use of the pronunciation in the audio file 312 used for the text string 304 comprises category 306, e.g., field of use, and language 308. In alternative implementations, additional or different attributes of the context in which the pronunciation recorded in the audio file 312 is used for the text string 304 may be provided. Additional attributes may include user profile attributes of users to which the text is directed, etc. Further, in described embodiments, the pronunciation data structure 300$_i$ is provided for text strings comprising abbreviations or acronyms. In additional embodiments, the text string may comprise other specified types of text strings and is not limited to abbreviations/acronyms.

FIG. 3 shows one implementation of the pronunciation data structure. In alternative embodiments, the data structures and fields used to represent the information in the pronunciation data structure 300$_i$ may be represented in different data arrangements, such as in different database records and objects that provide the association of data shown in FIG. 3.

Figure 4:
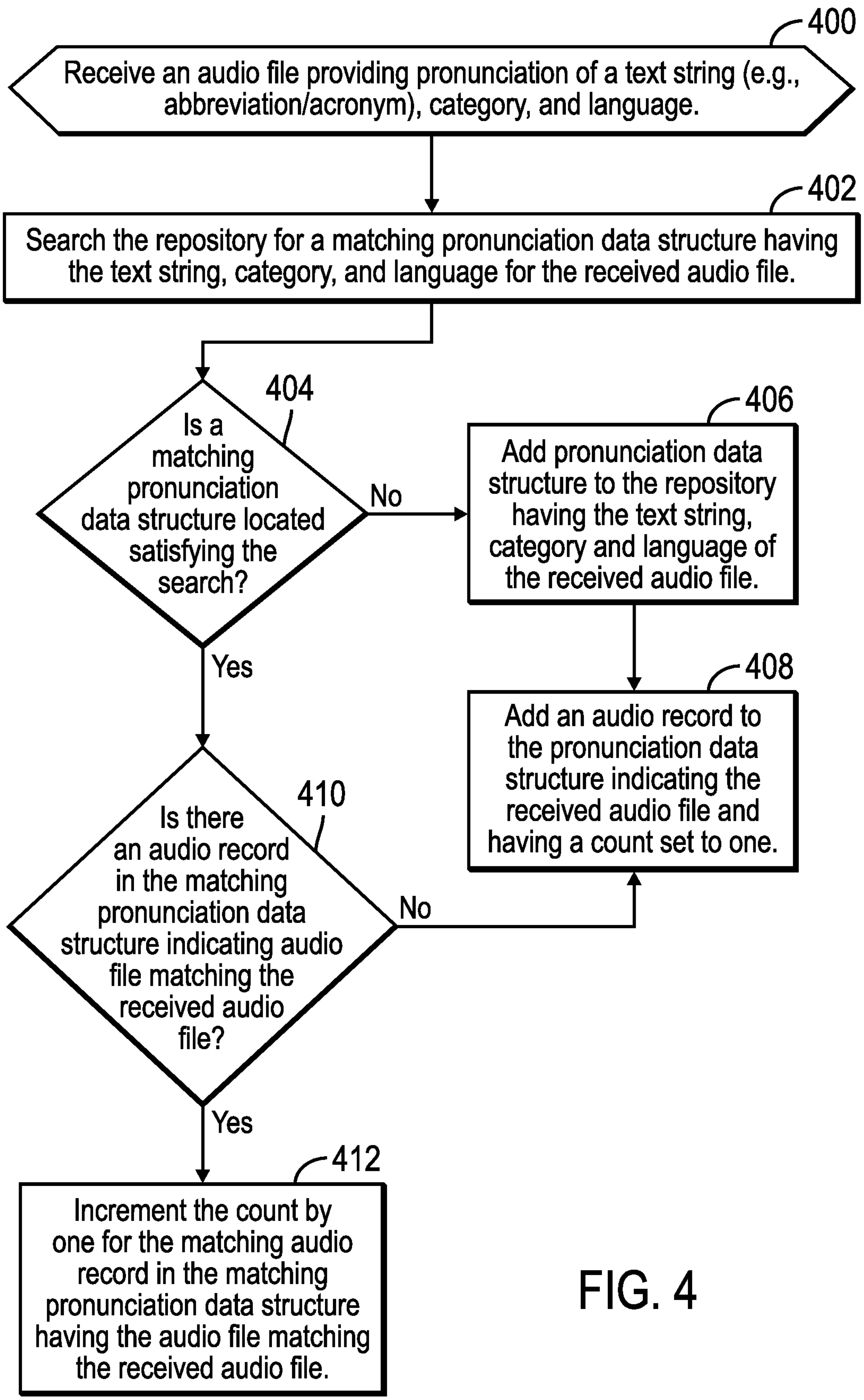
FIG. 4 illustrates an embodiment of operations to update a pronunciation data structure in a repository with information on an audio file received for a specific type of text string.

FIG. 4 illustrates an embodiment of operations performed by the pronunciation repository updater 118 to update a pronunciation data structure 300$_i$ already in the repository 114 or add a new pronunciation data structure 300$_i$ to the repository 114 based on a digital audio file located by the pronunciation collector 116 providing a pronunciation for a text string. Upon receiving (at block 400) an audio file providing a pronunciation of a text string, e.g., abbreviation/acronym, category, and language from the pronunciation collector 116 or other source, the pronunciation repository updater 118 searches (at block 402) the repository 114 for a matching pronunciation data structure 300$_i$ having the received search text string 204, category 206, and search language 208 for the received audio file. If (at block 404) a matching pronunciation data structure 300$_i$ is not located that satisfies the search parameters, then a pronunciation data structure 300$_i$ is added (at block 406) to the repository 114 having the text string 304, category 306 and language 308 provided for the received audio file. The pronunciation repository updater 118 further adds (at block 408) an audio file record 310 to the new pronunciation data structure 300$_i$ including the indication of the audio file 312 and a count 314 set to indicate one instance of the audio file 312 was located.

If (at block 404) there is a matching pronunciation data structure 300$_i$ in the repository 114 satisfying the search request, then a determination is made (at block 410) whether the matching pronunciation data structure 300$_i$ indicates in audio file field 312 an audio file matching the received audio file. If (at block 410) there is a matching audio file, then the count 314 in the audio file record 310 having the matching audio file 312 is incremented (at block 412) by one. If (at block 410) there is no matching pronunciation data structure 300$_i$ matching the search request, then control proceeds to block 408 to add a pronunciation data structure 300$_i$ to the repository for the located new audio file.

With the embodiment of FIG. 4, upon collecting or receiving a new audio file for a text string, such as an abbreviation/acronym, and attributes of the use of the pronunciation for the text string, the repository 114 is updated to increase a count if that received audio file is already indicated in a pronunciation data structure 300$_i$ or a new pronunciation data structure 300$_i$ is added to the repository 114 so that the repository retains all received audio files providing pronunciations for a specified type of text string and a frequency that particular pronunciation, as recorded in the received audio file, is detected. This ensures that the most frequently used pronunciations for a text string type, such as an acronym/abbreviation, are maintained and indicated as such in the repository 114 and available to provide to the speech synthesizer 106 when needed to convert text-to-speech.

Figure 5:
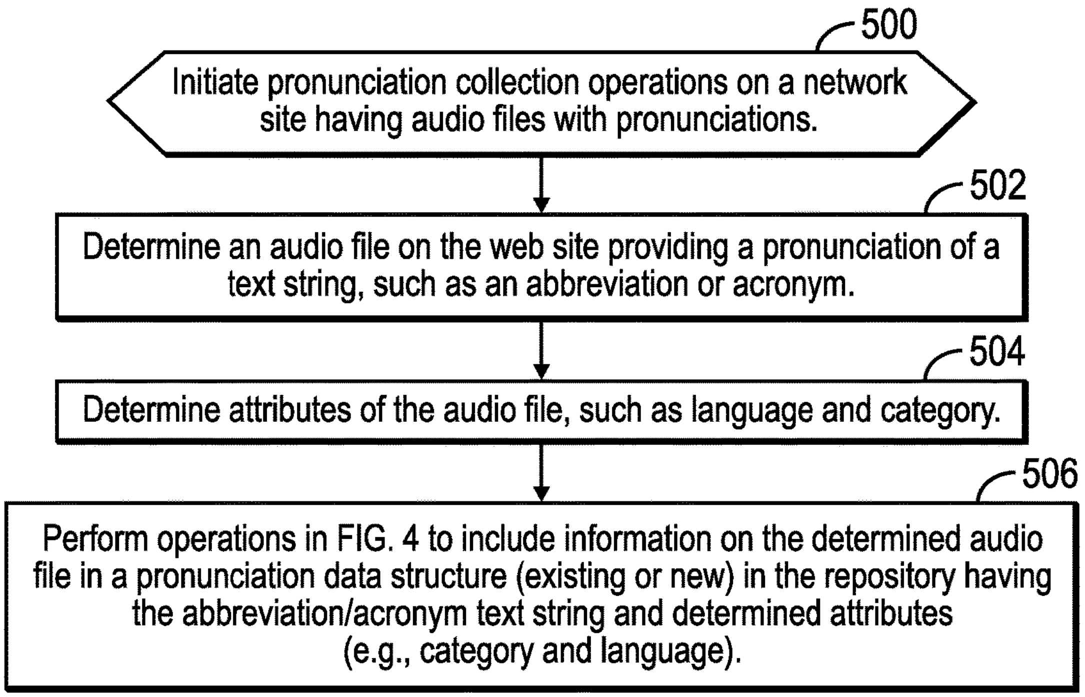
FIG. 5 illustrates an embodiment of operations to collect pronunciations for a specific type of text string in audio files published on a network site.

FIG. 5 illustrates an embodiment of operations performed by the pronunciation collector 116 to gather audio files having pronunciations of text strings from a network location, such as a web site. The pronunciation collector 116 may be configured to process specific web site addresses known to have pronunciations for abbreviations/acronyms, or crawl the World Wide Web looking for web sites having audio files providing pronunciations of abbreviations/acronyms. Upon initiating (at block 500) operations on a web site or network location having audio files with pronunciations, the pronunciation collector 116 determines (at block 502) an audio file on the web site providing a pronunciation of a text string, such as an abbreviation or acronym. The pronunciation collector 116 then determines (at block 504) attributes of the located audio file, such as language and category. The attributes may be provided with metadata of the audio file or may be determined by the pronunciation collector 116 performing natural language processing (NLP) of the web site to determine the attributes of the located audio file. In such case, the pronunciation collector 116 may implement NLP processing algorithms and capabilities. The pronunciation collector 116 may then call (at block 506) the pronunciation repository updater 118 to perform the operations in FIG. 4 to include information on the determined audio file in a pronunciation data structure 300$_i$ (existing or new) in the repository having the abbreviation/acronym text string and determined attributes (e.g., category and language).

Figure 6:
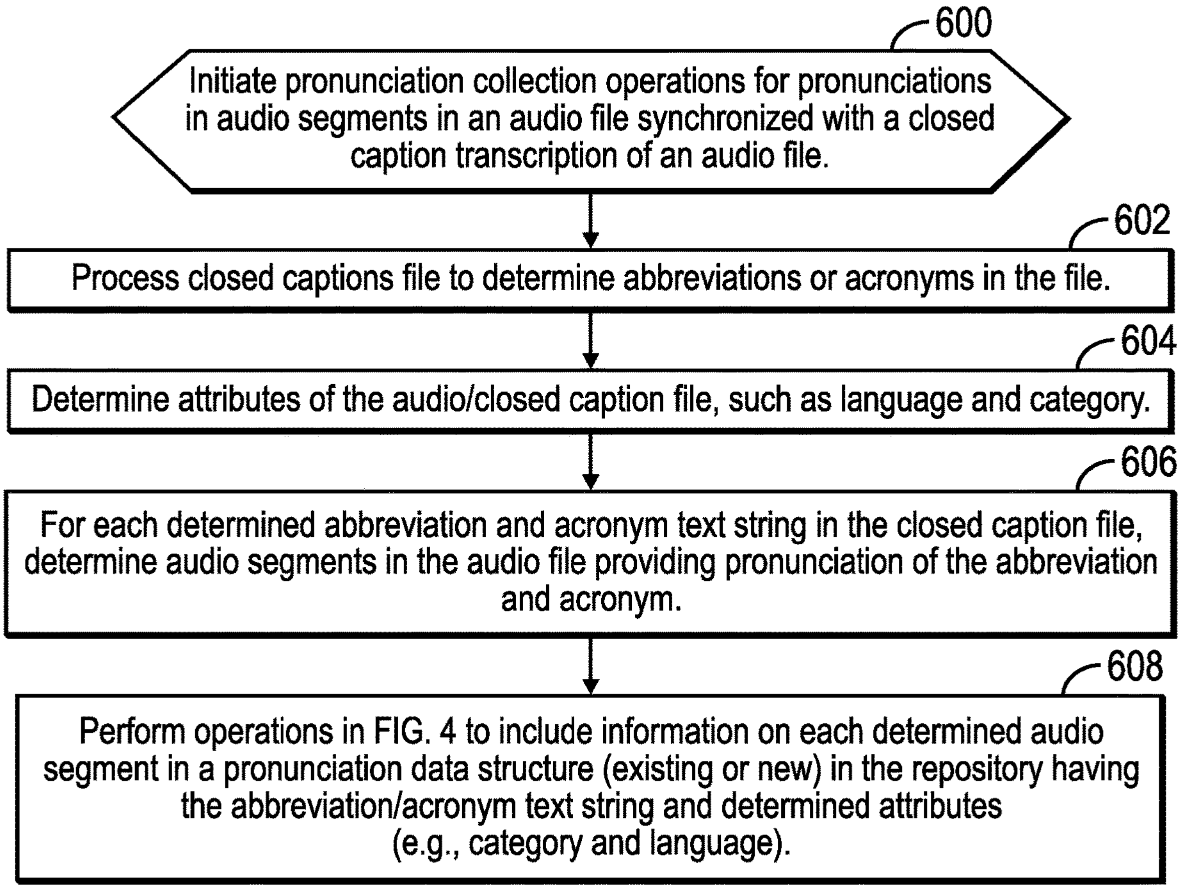
FIG. 6 illustrates an embodiment of operations to collect pronunciations for a specific type of text string found in a closed caption transcription of an audio file.

FIG. 6 illustrates an embodiment of operations performed by the pronunciation collector 116 to determine pronunciations from audio segments in an audio file synchronized with closed captions in a transcription of an audio file. Upon initiating (at block 600) operations to harvest pronunciations from closed captions synchronized with audio segments in an audio file, the pronunciation collector 116 processes (at block 602) closed captions in a transcription of an audio file to determine abbreviations or acronyms, or other specified strings, in the transcription, which comprises text converted from the digital audio file. The pronunciation collector 116 determines (at block 604) attributes of the audio/closed caption file, such as language and category. This information may be determined by determining the language of the audio file. The attributes of the audio file, such as category and language, may be determined by natural language processing of the closed caption transcription to determine a category or from metadata associated with the audio file.

For each determined abbreviation and acronym text string identified in the closed caption transcription, the pronunciation collector 116 determines (at block 606) audio segments in the audio file providing pronunciations of the abbreviations and acronyms in the closed caption file, where the text in the closed caption file is synchronized to audio providing speech for the closed captions. The pronunciation collector 116 may then call (at block 608) the pronunciation repository updater 118 to perform the operations in FIG. 4 to include, in a pronunciation data structure 300$_i$ (existing or new) in the repository 114, information on the audio segments in the audio file that synchronize to abbreviation/acronym strings in the closed caption file. The pronunciation data structure $300_i$ includes the abbreviation/acronym 304 and determined category 306 and language 308, along with the audio segment.

Figure 7:
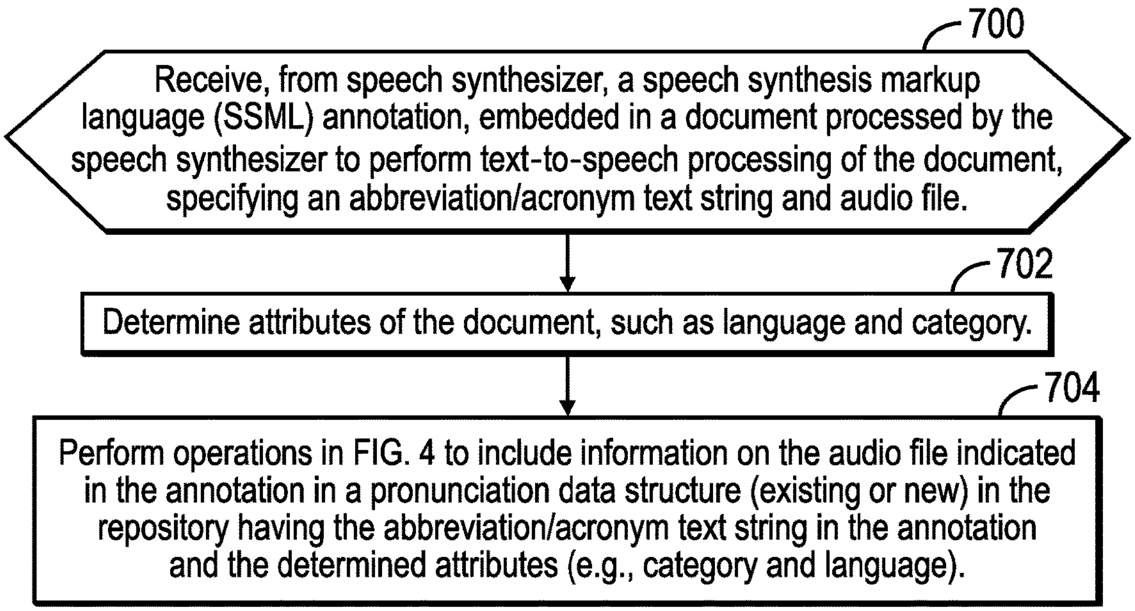
FIG. 7 illustrates an embodiment of operations to collect pronunciations for a text string provided in an annotation in a document subject to speech synthesis.

FIG. 7 illustrates an embodiment of operations performed by the pronunciation collector 116 to include information on an audio file for a pronunciation indicated with an annotation included in a document being processed by a speech synthesizer 106. The annotation may be encoded with SSML embedded by a user in the document subject to the text-to-speech conversion. The SSML annotation may be provided by the speech synthesizer 106 when processing the document 108 including the text to translate to speech. The annotation indicates the text string, abbreviation/acronym, the audio file to pronounce the text string, and may indicate the language and category. Upon receiving (at block 700), from the speech synthesizer 106, a speech synthesis markup language (SSML) annotation, embedded in the document 108 processed by the speech synthesizer, the pronunciation collector 116 determines (at block 702) attributes of the document 108, such as language and category. This information may be provided by the speech synthesizer 106. The pronunciation collector 116 performs (at block 704) the operations in FIG. 4 to include information on the audio file indicated in the annotation in a pronunciation data structure $300_i$ (existing or new) in the repository 114 having the abbreviation/acronym text string in the annotation and the determined attributes (e.g., category and language).

With the operations of FIGS. 5, 6, and 7, the pronunciation collector 116 may gather pronunciations for abbreviations and acronyms from different locations to include in pronunciation data structures 300 in the repository 114 to use for text-to-speech conversion of the located abbreviations and acronyms. Further, by accessing duplicate pronunciations matching information in data structures in the repository, the pronunciation collector 116 may update the count 314 or frequency values indicating a number of time pronunciations in audio files were used or located for the same text string, category, and language. This gathered frequency information 314 may be used to determine a priority of the audio files 312 in the pronunciation data structure $300_i$ for the text string 304.

Figure 8:
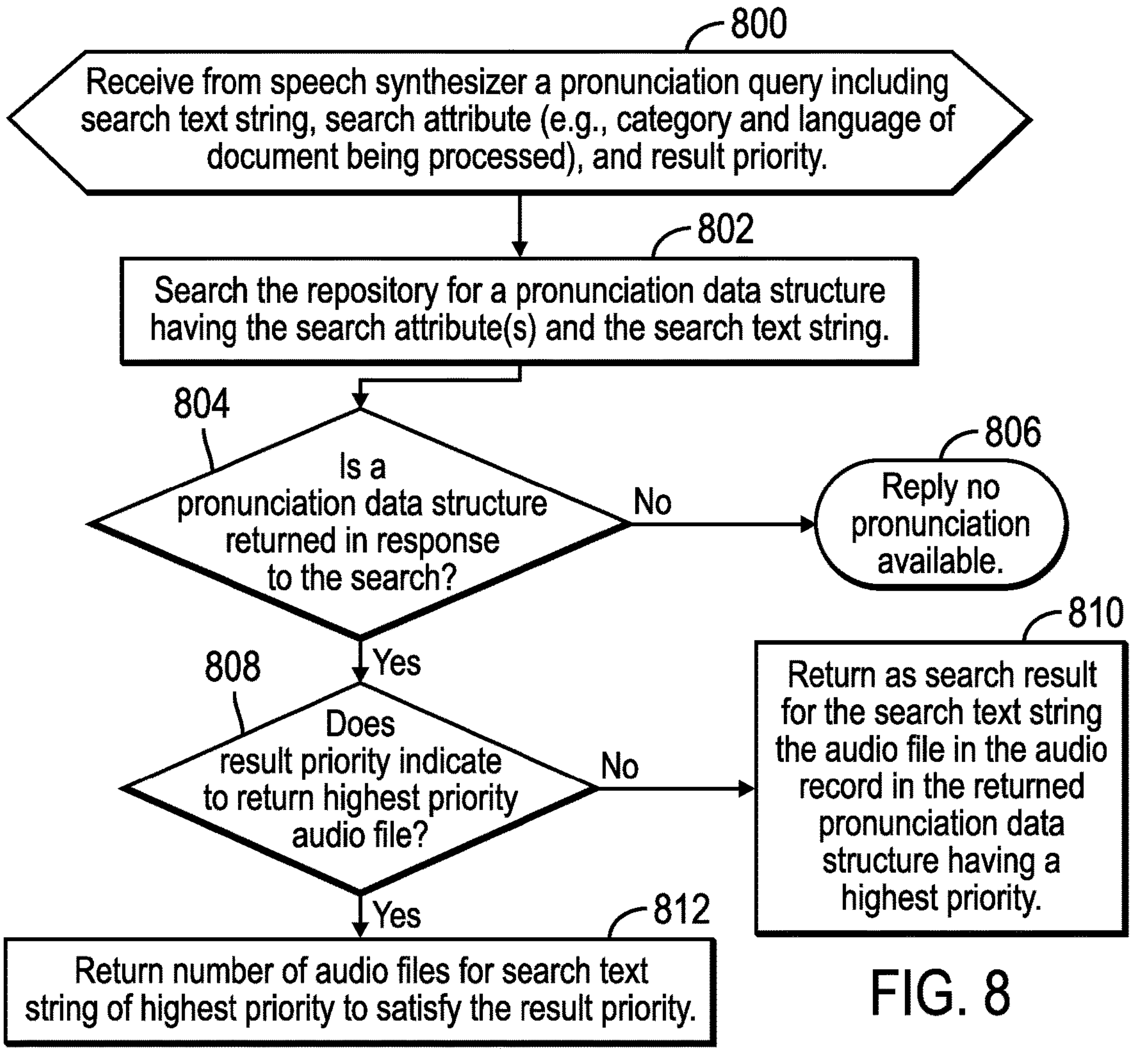
FIG. 8 illustrates an embodiment of operations to process a pronunciation query for an audio file for a text string having search attributes to return an audio file in a repository providing a pronunciation of the text string in the pronunciation query

FIG. 8 illustrates an embodiment of operations performed by the pronunciation engine 110 and repository searcher 112 to process a pronunciation query 200 from the speech synthesizer 106. Upon receiving (at block 800) a pronunciation query 200 from the speech synthesizer 106 including a search text string 204, search attribute (e.g., category 206 and language 208 of document 108 being processed), and result priority 210, the pronunciation engine 110 invokes (at block 802) the repository searcher 112 to search the repository 114 for a pronunciation data structure $300_i$ having the search attribute(s) 206, 208 and the search text string 204 in the received pronunciation query 200. If (at block 804) there is no pronunciation data structure $300_i$ returned in response to the search, then the pronunciation engine 110 returns (at block 806) a reply that no pronunciation is available in the repository 114. In such case, the speech synthesizer 106, upon receiving that reply of no available pronunciation, may synthesize the text with its native algorithm to produce speech. If (at block 804) a pronunciation data structure $300_i$ is returned, then the pronunciation engine 110 determines (at block 808) whether the result priority 210 indicates to return the highest priority audio file 312. If (at block 808) the request is for only the highest priority audio file for the pronunciation, then the pronunciation engine 110 returns (at block 810) to the speech synthesizer 106, as a search result for the search text string, the audio file 312 in the audio file record 310 in the returned pronunciation data structure $300_i$ having a highest priority or highest count 314. If (at block 808) the result priority 210 in the query 200 indicates to return multiple of highest priority audio files, then the pronunciation engine 110 returns a number of audio files for the search text string of highest priority to satisfy the result priority.

With the embodiment of FIG. 8, the pronunciation engine processes a request from a speech synthesizer for a better or more accurate pronunciation for an abbreviation or acronym in the text than would be provided by the speech synthesizer 106. The pronunciation engine 110 determines the most frequently accessed audio file 312 for the pronunciation data structure $300_i$ having the provided attributes (e.g., category and language). This most frequently accessed or common pronunciation/audio file 312 may be returned to the speech synthesizer 106 to use to convert the specified abbreviation or acronym, or other text, to speech.

The present invention may be a system, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 900 contains an example of an environment for the execution of the pronunciation server 100 program components 945, including program components 110, 112, 116, and 118 (FIG. 1), involved in performing the operations to maintain and provide pronunciations for abbreviations and acronyms.

In addition to block 901, computing environment 900 includes, for example, computer 901, wide area network (WAN) 902, end user device (EUD) 903, remote server 904, public cloud 905, and private cloud 906. In this embodiment, computer 901 includes processor set 910 (including processing circuitry 920 and cache 921), communication fabric 911, volatile memory 912, persistent storage 913 (including operating system 922 and block 901, as identified above), peripheral device set 914 (including user interface (UI) device set 923, storage 924, and Internet of Things (IoT) sensor set 925), and network module 915. Remote server 904 includes remote database 930. Public cloud 905 includes gateway 940, cloud orchestration module 941, host physical machine set 942, virtual machine set 943, and container set 944.

Figure 9:
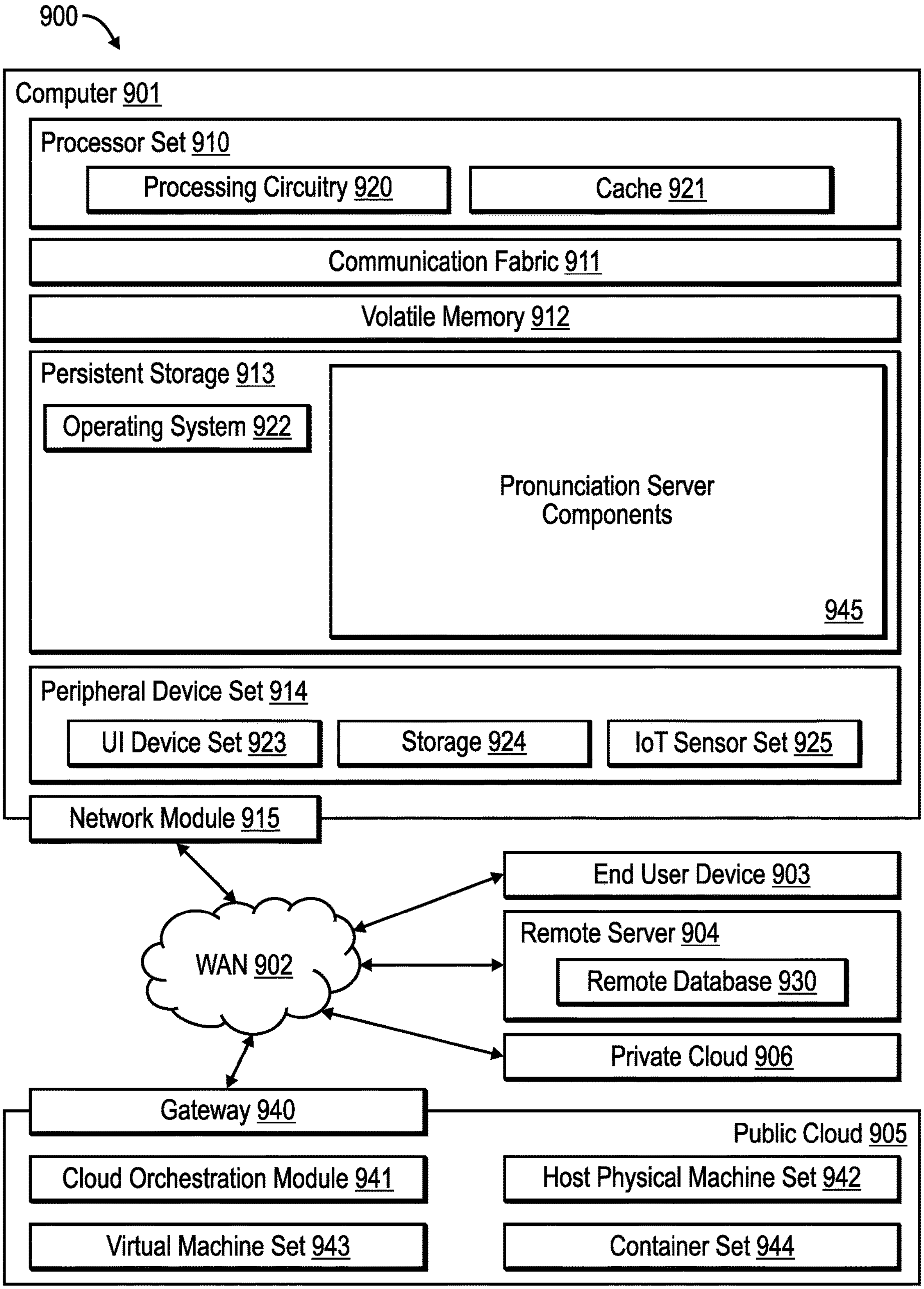
FIG. 9 illustrates a computing environment in which the components of FIG. 1 may be implemented.

COMPUTER 901 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 930. As is well understood in the art of computer technology, and depending upon the technology, performance of a computer-implemented method may be distributed among multiple computers and/or between multiple locations. On the other hand, in this presentation of computing environment 900, detailed discussion is focused on a single computer, specifically computer 901, to keep the presentation as simple as possible. Computer 901 may be located in a cloud, even though it is not shown in a cloud in FIG. 9. On the other hand, computer 901 is not required to be in a cloud except to any extent as may be affirmatively indicated.

PROCESSOR SET 910 includes one, or more, computer processors of any type now known or to be developed in the future. Processing circuitry 920 may be distributed over multiple packages, for example, multiple, coordinated integrated circuit chips. Processing circuitry 920 may implement multiple processor threads and/or multiple processor cores. Cache 921 is memory that is located in the processor chip package(s) and is typically used for data or code that should be available for rapid access by the threads or cores running on processor set 910. Cache memories are typically organized into multiple levels depending upon relative proximity to the processing circuitry. Alternatively, some, or all, of the cache for the processor set may be located "off chip." In some computing environments, processor set 910 may be designed for working with qubits and performing quantum computing.

Computer readable program instructions are typically loaded onto computer 901 to cause a series of operational steps to be performed by processor set 910 of computer 901 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 921 and the other storage media discussed below. The program instructions, and associated data, are accessed by processor set 910 to control and direct performance of the inventive methods. In computing environment 900, at least some of the instructions for performing the inventive methods may be stored in persistent storage 913.

COMMUNICATION FABRIC 911 is the signal conduction path that allows the various components of computer 901 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 912 is any type of volatile memory now known or to be developed in the future. Examples include dynamic type random access memory (RAM) or static type RAM. Typically, volatile memory 912 is characterized by random access, but this is not required unless affirmatively indicated. In computer 901, the volatile memory 912 is located in a single package and is internal to computer 901, but, alternatively or additionally, the volatile memory may be distributed over multiple packages and/or located externally with respect to computer 901.

PERSISTENT STORAGE 913 is any form of non-volatile storage for computers that is now known or to be developed in the future. The non-volatility of this storage means that the stored data is maintained regardless of whether power is being supplied to computer 901 and/or directly to persistent storage 913. Persistent storage 913 may be a read only memory (ROM), but typically at least a portion of the persistent storage allows writing of data, deletion of data and re-writing of data. Some familiar forms of persistent storage include magnetic disks and solid state storage devices. Operating system 922 may take several forms, such as various known proprietary operating systems or open source Portable Operating System Interface-type operating systems that employ a kernel. The code included in block 945 typically includes at least some of the computer code involved in performing the inventive methods.

PERIPHERAL DEVICE SET 914 includes the set of peripheral devices of computer 901. Data communication connections between the peripheral devices and the other components of computer 901 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 923 may include components such as a display screen, speaker, microphone, wearable devices (such as goggles and smart watches), keyboard, mouse, printer, touchpad, game controllers, and haptic devices. Storage 924 is external storage, such as an external hard drive, or insertable storage, such as an SD card. Storage 924 may be persistent and/or volatile. In some embodiments, storage 924 may take the form of a quantum computing storage device for storing data in the form of qubits. In embodiments where computer 901 is required to have a large amount of storage (for example, where computer 901 locally stores and manages a large database) then this storage may be provided by peripheral storage devices designed for storing very large amounts of data, such as a storage area network (SAN) that is shared by multiple, geographically distributed computers. IoT sensor set 925 is made up of sensors that can be used in Internet of Things applications. For example, one sensor may be a thermometer and another sensor may be a motion detector.

NETWORK MODULE 915 is the collection of computer software, hardware, and firmware that allows computer 901 to communicate with other computers through WAN 902. Network module 915 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 915 are performed on the same physical hardware device. In other embodiments (for example, embodiments that utilize software-defined networking (SDN)), the control functions and the forwarding functions of network module 915 are performed on physically separate devices, such that the control functions manage several different network hardware devices. Computer readable program instructions for performing the inventive methods can typically be downloaded to computer 901 from an external computer or external storage device through a network adapter card or network interface included in network module 915.

WAN 902 is any wide area network (for example, the internet) capable of communicating computer data over non-local distances by any technology for communicating computer data, now known or to be developed in the future. In some embodiments, the WAN 902 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 903 is any computer system that is used and controlled by an end user (for example, a customer of an enterprise that operates computer 901), and may take any of the forms discussed above in connection with computer 901. EUD 903, which may include the components of client 102 in FIG. 1, typically receives helpful and useful data from the operations of computer 901. For example, in a hypothetical case where computer 901 is designed to provide a recommendation to an end user, this recommendation would typically be communicated from network module 915 of computer 901 through WAN 902 to EUD 903. In this way, EUD 903 can display, or otherwise present, the recommendation to an end user. In some embodiments, EUD 903 may be a client device, such as thin client, heavy client, mainframe computer, desktop computer and so on.

REMOTE SERVER 904 is any computer system that serves at least some data and/or functionality to computer 901. Remote server 904 may be controlled and used by the same entity that operates computer 901. Remote server 904 represents the machine(s) that collect and store helpful and useful data for use by other computers, such as computer 901. For example, in a hypothetical case where computer 901 is designed and programmed to provide a recommendation based on historical data, then this historical data may be provided to computer 901 from remote database 930 of remote server 904.

PUBLIC CLOUD 905 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 905 is performed by the computer hardware and/or software of cloud orchestration module 941. The computing resources provided by public cloud 905 are typically implemented by virtual computing environments that run on various computers making up the computers of host physical machine set 942, which is the universe of physical computers in and/or available to public cloud 905. The virtual computing environments (VCEs) typically take the form of virtual machines from virtual machine set 943 and/or containers from container set 944. It is understood that these VCEs may be stored as images and may be transferred among and between the various physical machine hosts, either as images or after instantiation of the VCE. Cloud orchestration module 941 manages the transfer and storage of images, deploys new instantiations of VCEs and manages active instantiations of VCE deployments. Gateway 940 is the collection of computer software, hardware, and firmware that allows public cloud 905 to communicate through WAN 902.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 906 is similar to public cloud 905, except that the computing resources are only available for use by a single enterprise. While private cloud 906 is depicted as being in communication with WAN 902, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 905 and private cloud 906 are both part of a larger hybrid cloud.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for providing audio pronunciations to a speech synthesizer to use to convert text to speech in a document, the computer program product comprising a computer readable storage medium having computer readable program code embodied therein that is executable to perform operations, the operations comprising:

providing data structures in a repository for text strings in documents, wherein a data structure for a text string in a document indicates at least one attribute of a presentation of the text string in the document and at least one audio file providing at least one audio pronunciation of the text string;

receiving, from the speech synthesizer, a search text string and a search attribute;

determining a data structure in the repository including a text string and an attribute matching the search text string and the search attribute, respectively; and returning an audio file, indicated in the determined data structure, to the speech synthesizer to output for the search text string in a document being processed by the speech synthesizer.

2. The computer program product of claim 1, wherein the data structures in the repository have a plurality of attributes for presentations of the text strings comprising a category and language in which the text string is presented, wherein the search attribute comprises a plurality of search attributes comprising a search category and a search language, wherein the determined data structure includes a language and category matching the search category and the search language, respectively.

3. The computer program product of claim 1, wherein there are a plurality of the data structures having a same text string and different attributes for different categories and languages.

4. The computer program product of claim 1, wherein the text strings comprise one of an acronym and abbreviation included in the document.

5. The computer program product of claim 1, wherein at least one of the data structures indicates a plurality of audio files providing different pronunciations of a text string for an attribute, and, for each audio file of the indicated plurality of audio files, includes a priority ranking of the indicated plurality of audio files with respect to other of the indicated plurality of audio files, wherein the returned audio file comprises a highest ranked audio file of the indicated plurality of audio files.

6. The computer program product of claim 1, wherein at least one of the data structures indicates a plurality of audio files providing different pronunciations for a text string and includes a count for each of the indicated plurality of audio files indicated in the at least one of the data structures used to rank the indicated plurality of audio files, wherein the operations further comprise:

receiving an audio file for a text string and attribute;

determining a matching data structure in the repository having the text string and the attribute for the received audio file;

determining whether the matching data structure indicates an audio file matching the received audio file;

incrementing a count for the audio file, indicated in the matching data structure, in response to determining that the matching data structure indicates the audio file matching the received audio file; and indicating the received audio file in the matching data structure and setting a count in the matching data structure for the received audio file to indicate one instance in response to determining the matching data structure does not have an audio file matching the received audio file.

7. The computer program product of claim 1, wherein the operations further comprise:

receiving an audio file for a text string and attribute;

determining whether the repository includes a matching data structure indicating the received audio file and the text string and the attribute for the received audio file;

adding indication of the received audio file to the matching data structure, determined in the repository, to provide a pronunciation for the text string for the received audio file in response to determining that the repository includes the matching data structure; and adding a data structure to the repository for the received audio file including the text string and the attribute for the received audio file in response to determining that the repository does not include a matching data structure.

8. The computer program product of claim 1, wherein the operations further comprise:

processing audio files associated with text strings on a network site;

determining an attribute of the text strings for the processed audio files on the network site; and creating data structures in the repository for the processed audio files on the network site, wherein a data structure created for a processed audio file on the network site includes the text string associated with the audio file, the determined attribute of the text string, and access to the audio file.

9. The computer program product of claim 1, wherein the operations further comprise:

processing synchronized captions in a transcript of an audio presentation to determine text strings in the synchronized captions comprising acronyms and abbreviations in the synchronized captions;

determining audio segments in the audio presentation for the determined text strings in the synchronized captions;

determining an attribute of a context of the audio presentation; and creating data structures in the repository for the audio segments, wherein a data structure created for an audio segment of the audio segments includes the text string associated with the audio segment, the determined attribute, and access information for the audio file.

10. The computer program product of claim 1, wherein the operations further comprise:

receiving an annotation from a user as input to the speech synthesizer with a user provided audio file for the speech synthesizer to output when processing a specified text string in the document; and creating a data structure in the repository for the user provided audio file including the text string in the annotation and access information for the user provided audio file indicated in the annotation.

11. A system for providing audio pronunciations to a speech synthesizer to use to convert text to speech in a document, comprising:

a processor; and a computer readable storage medium having computer readable program code embodied therein that when executed by the processor performs operations, the operations comprising:

providing data structures in a repository for text strings in documents, wherein a data structure for a text string in a document indicates at least one attribute of a presentation of the text string in the document and at least one audio file providing at least one audio pronunciation of the text string;

receiving, from the speech synthesizer, a search text string and a search attribute;

determining a data structure in the repository including a text string and an attribute matching the search text string and the search attribute, respectively; and returning an audio file, indicated in the determined data structure, to the speech synthesizer to output for the search text string in a document being processed by the speech synthesizer.

12. The system of claim 11, wherein the data structures in the repository have a plurality of attributes comprising a category and language in which the text string is presented, wherein the search attribute comprises a plurality of search attributes comprising a search category and a search language, wherein the determined data structure includes a language and category matching the search category and the search language, respectively.

13. The system of claim 11, wherein at least one of the data structures indicates a plurality of audio files providing different pronunciations of a text string for an attribute, and, for each audio file of the indicated plurality of audio files, includes a priority ranking of the indicated plurality of audio files with respect to other of the indicated plurality of audio files, wherein the returned audio file comprises a highest ranked audio file of the indicated plurality of audio files.

14. The system of claim 11, wherein at least one of the data structures indicates a plurality of audio files providing different pronunciations for a text string and includes a count for each of the indicated plurality of audio files indicated in the at least one of the data structures used to rank the indicated plurality of audio files, wherein the operations further comprise:

receiving an audio file for a text string and attribute;

determining a matching data structure in the repository having the text string and the attribute for the received audio file;

determining whether the matching data structure indicates an audio file matching the received audio file;

incrementing a count for the audio file, indicated in the matching data structure, in response to determining that the matching data structure indicates the audio file matching the received audio file; and indicating the received audio file in the matching data structure and setting a count in the matching data structure for the received audio file to indicate one instance in response to determining the matching data structure does not have an audio file matching the received audio file.

15. The system of claim 11, wherein the operations further comprise:

receiving an audio file for a text string and attribute;

determining whether the repository includes a matching data structure indicating the received audio file and the text string and the attribute for the received audio file;

adding indication of the received audio file to the matching data structure, determined in the repository, to provide a pronunciation for the text string for the received audio file in response to determining that the repository includes the matching data structure; and adding indication of the received audio file to the matching data structure, determined in the repository, to provide a pronunciation for the text string for the received audio file in response to determining that the repository includes the matching data structure; and adding a data structure to the repository for the received audio file including the text string and the attribute for the received audio file in response to determining that the repository does not include a matching data structure.

16. A method for providing audio pronunciations to a speech synthesizer to use to convert text to speech in a document, comprising:

providing data structures in a repository for text strings in documents, wherein a data structure for a text string in a document indicates at least one attribute of a presentation of the text string in the document and at least one audio file providing at least one audio pronunciation of the text string;

receiving, from the speech synthesizer, a search text string and a search attribute;

determining a data structure in the repository including a text string and an attribute matching the search text string and the search attribute, respectively; and returning an audio file, indicated in the determined data structure, to the speech synthesizer to output for the search text string in a document being processed by the speech synthesizer.

17. The method of claim 16, wherein the data structures in the repository have a plurality of attributes comprising a category and language in which the text string is presented, wherein the search attribute comprises a plurality of search attributes comprising a search category and a search language, wherein the determined data structure includes a language and category matching the search category and the search language, respectively.

18. The method of claim 16, wherein at least one of the data structures indicates a plurality of audio files providing different pronunciations of a text string for an attribute, and, for each audio file of the indicated plurality of audio files, includes a priority ranking of the indicated plurality of audio files with respect to other of the indicated plurality of audio files, wherein the returned audio file comprises a highest ranked audio file of the indicated plurality of audio files.

19. The method of claim 16, wherein at least one of the data structures indicates a plurality of audio files providing different pronunciations for a text string and includes a count for each of the indicated plurality of audio files indicated in the at least one of the data structures used to rank the indicated plurality of audio files, further comprising:

receiving an audio file for a text string and attribute;

determining a matching data structure in the repository having the text string and the attribute for the received audio file;

determining whether the matching data structure indicates an audio file matching the received audio file;

incrementing a count for the received audio file, indicated in the matching data structure, in response to determining that the matching data structure indicates the received audio file matching the received audio file; and indicating the received audio file in the matching data structure and setting a count in the matching data structure for the received audio file to indicate one instance in response to determining the matching data structure does not have an audio file matching the received audio file.

20. The method of claim 16, further comprising:

receiving an audio file for a text string and attribute;

determining whether the repository includes a matching data structure indicating the received audio file and the text string and the attribute for the received audio file;

adding indication of the received audio file to the matching data structure, determined in the repository, to provide a pronunciation for the text string for the received audio file in response to determining that the repository includes the matching data structure; and adding indication of the received audio file to the matching data structure, determined in the repository, to provide a pronunciation for the text string for the received audio file in response to determining that the repository includes the matching data structure; and adding a data structure to the repository for the received audio file including the text string and the attribute for the received audio file in response to determining that the repository does not include a matching data structure.

* * * * *